United States Patent [19]

Gupta

[11] Patent Number: 4,670,500

[45] Date of Patent: Jun. 2, 1987

[54] SURFACE COATING COMPOSITION

[75] Inventor: D. V. Satyanarayana Gupta, The Woodlands, Tex.

[73] Assignee: Pennzoil Company, Houston, Tex.

[21] Appl. No.: 811,882

[22] Filed: Dec. 20, 1985

[51] Int. Cl.$^4$ ............................................. C08K 3/34
[52] U.S. Cl. ................................. 524/447; 524/448;
        524/474; 524/475; 524/506; 525/100; 525/102
[58] Field of Search ............ 524/506, 448, 474, 475,
                                   524/447; 525/100, 102

[56] References Cited

U.S. PATENT DOCUMENTS

| | | | |
|---|---|---|---|
| T958,001 | 5/1977 | Gower et al. | 526/271 |
| 3,429,842 | 2/1969 | Wolstoncroft | 260/28.5 |
| 3,554,790 | 1/1971 | Gehman et al. | 117/161 |
| 3,661,628 | 5/1972 | Marsden | 524/506 |
| 3,772,237 | 11/1973 | Bullman | 525/102 |
| 3,853,605 | 12/1974 | Fahey | 525/102 |
| 3,856,533 | 12/1974 | Schnurrbusch et al. | 106/10 |
| 3,935,147 | 1/1976 | Godshalk et al. | 524/506 |
| 3,960,575 | 6/1976 | Martin | 106/10 |
| 4,070,510 | 1/1978 | Kahn | 427/385 R |
| 4,113,677 | 9/1978 | Svedas et al. | 524/506 |
| 4,247,330 | 1/1981 | Sanders | 106/3 |
| 4,265,663 | 5/1981 | Gilicinski et al. | 106/10 |
| 4,340,524 | 7/1982 | Bullman | 524/506 |
| 4,347,333 | 8/1982 | Lohr et al. | 524/269 |
| 4,485,131 | 11/1984 | Adams et al. | 427/388.2 |
| 4,495,327 | 1/1985 | Schenck et al. | 524/556 |

FOREIGN PATENT DOCUMENTS 0047501 5/1974 Japan .................................. 524/506

*Primary Examiner*—Joseph L. Schofer
*Assistant Examiner*—J. M. Reddick
*Attorney, Agent, or Firm*—Lowe, Price, Leblanc, Becker & Shur

[57] ABSTRACT

A surface coating composition comprising an amino-functional silicone polymer, a metal chelated acrylic polymer a hydrocarbon solvent and water. The metal-chelated acrylic polymer preferably comprises zinc, and the composition may further comprise abrasive materials, surfactants, thickeners and stabilizers. The surface coating composition is particularly adapted for providing a glossy and durable finish on a surface.

10 Claims, No Drawings

SURFACE COATING COMPOSITION

FIELD OF THE INVENTION

The present invention relates to a surface coating composition and more particularly relates to a surface sealant composition for providing a glossy and durable finish on a surface.

BACKGROUND OF THE INVENTION

Various surface coating compositions are known for providing glossy, protective and durable finishes on a hard surface such as painted metal, flooring materials such as linoleum and tile, glass and wood. It is desirable that such compositions are detergent resistant in order to provide better gloss retention. For example, U.S. Pat. Nos. 3,856,533 to Schnurrbusch et al, 3,960,575 to Martin and 4,247,330 to Sanders disclose surface coating compositions including silicone compounds which provide glossy, detergent resistant finishes. Additionally, U.S. Pat. Nos. 3,554,790 to Gehman and 4,070,510 to Kahn disclose polishing compositions including metal chelate compounds which provide glossy surface finishes. The U.S. Pat. Nos. 3,429,842 to Wolstoncroft and 4,347,333 to Lohr et al disclose coating compositions including silicone and acrylic polymers which also provide high gloss finishes.

While such compositions initially impart high gloss and detergent resistance to the coated surface, repeated detergent washings cause loss of gloss and a reduction in the protective properties of the coatings. For example, when such coatings are applied to automobile outer surfaces, repeated washings of the surfaces causes dulling of the finish and reduces the protective properties of the coatings.

SUMMARY OF THE INVENTION

Accordingly, it is an object of the present invention to provide a surface coating composition which produces a high gloss and protective finish. It is a further object of the invention to provide a surface coating composition which is durable and detergent resistant. It is an additional object of the invention to provide a surface coating composition particularly adapted for providing automotive surfaces with a glossy, protective coating which is durable and resistant to car wash detergents.

Accordingly, these objects and advantages are achieved by the surface coating composition of the present invention which comprises an amino-functional silicone polymer, a metal-chelated acrylic polymer, a hydrocarbon solvent and water. The composition may be used to produce or restore a glossy, protective and durable finish on various surfaces as well as to prolong the useful lives of those surfaces. The composition is particularly adapted for producing or restoring a glossy, durable and protective finish on automotive surfaces.

The combination of the amino-functional silicone polymer and the metal-chelated acrylic polymer in the composition of the present invention provide improved gloss retention and extended detergent resistance. The composition may further include additional materials such as a abrasives, surfactants, thickeners and stabilizers.

DETAILED DESCRIPTION

The surface coating composition of the present invention provides a glossy, durable and protective finish on various surfaces. The surface coating composition comprises an amino-functional silicone polymer, a metal-chelated acrylic polymer, a hydrocarbon solvent and water. The composition may further include one or more additives such as abrasive materials, surfactants, thickeners and stabilizers.

The amino-functional silicone polymer included in the composition of the present invention may comprise any of the amino organopolysiloxanes known in the art. Generally, the amino-functional silicone polymer comprises a reactive silicone fluid including highly polar pendant aminoalkyl modifying groups. An example of a suitable amino-functional silicone polymer is represented by the following formula:

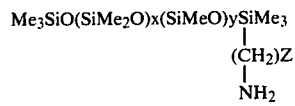

Such amino compounds are generally prepared by reacting polysiloxanes with organosilanes containing amino groups or siloxanes containing amino groups.

The amino-functional silicone polymer serves as a film forming gloss agent and provides increased resistance to detergent removal. The amino-functional silicone polymer binds to and coats a surface by chemical reaction, the amino groups reacting with residual nitrile groups in the underlying surface coating (for example a painted surface), and by polar interaction, coordinating through lone nitrogen pairs or by hydrogen bonding to a metal or polar substrate, respectively.

Various amino-functional silicone polymers are available commercially. For example, Dow Corning 531 and Dow Corning 536, supplied by Dow Corning Corporation, Midland, Mich., SF 784, SF 785, SF 556 and SF 770, supplied by SWS Silicones Corporation, Adrian, Mich., SF 1705, SF 1706, SF 1710, SM 2133 and SM 2135, supplied by General Electric Company, Waterford, N.Y., and UCAR AFL 40 and UCAR AFL 42, supplied by Union Carbide Corporation, Danbury, Conn., are all commercially available amino-functional silicone polymers and suitable for use in the composition of the present invention.

The amino-functional silicone polymer is preferably used in amounts ranging from about 0.5 to about 15% by weight in the surface coating composition of the present invention. More preferably, the amino-functional silicone polymer is used in amounts ranging from about 1 to about 10% by weight.

As set forth above, the amino-functional silicone polymer is used in combination with a metal-chelated acrylic polymer, a hydrocarbon solvent and water. The metal-chelated acrylic polymer may include a polyvalent metal compound such as zinc, nickel, zirconium, cobalt or copper. Preferably, the metal-chelated acrylic polymer comprises a zinc-chelated acrylic polymer. The acrylic polymer may be any of those well known in the art containing carboxyl groups (COOH) and including, but not limited to, the polymers and copolymers of acrylic acid, methacrylic acid, esters of these acids or acrylonitrile. Commercially available zinc-chelated acrylic polymers include Neocryl SR-276, supplied by Polyvinyl Chemical Industries, Wilmington, Mass., and Rhoplex B-924, supplied by Rohm and Haas Company, Philadelphia, Pa. When used in combination with the amino-functional silicone polymer according to the composition of the present invention, the metal-chelated acrylic polymer may be used in very small amounts, for example from about 0.001 to about 1.0% by weight of the surface coating composition. Preferably, the metal-chelated acrylic polymer is included in an amount of from about 0.001 to about 0.5 percent by weight.

The surface coating composition of the present invention further includes a hydrocarbon solvent and water. The hydrocarbon solvent is preferably selected from well-known hydrocarbon solvents such as straight and branch chained aliphatic hydrocarbons, naptha, kerosene, Stoddard solvent and mixtures thereof. The hydrocarbon solvent is preferably included in the surface coating composition in amounts ranging from about 5 to about 90% by weight. The hydrocarbon solvent serves as a detergent for oil-based traffic soils for example when the composition is used to restore a glossy, durable and protective finish on automotive surfaces. The hydrocarbon solvent also produces a stable composition and controls the drying rate of the composition when applied to a surface.

Water is also included in the composition of the invention, preferably in amounts ranging from about 5 to about 90% by weight. Depending on the particular hydrocarbon solvent and the respective amounts of solvent and water included in the composition, the composition is in the form of either an oil-in-water or water-in-oil emulsion.

The surface coating composition of the invention may further include various additives such as abrasives, waxes, surfactants, thickeners and stabilizers.

Abrasives which are included in the composition of the present invention serve as cleaning agents and remove soil from a surface when the composition is used to restore a glossy and durable finish on the surface. Preferable abrasive materials include aluminum silicate, diatomaceous earth, silica, alumina, and mixtures thereof. It should be noted that the abrasive material must be selected so as not to scratch the surface to which the composition is applied. Abrasive materials are included in the composition of the present invention in amounts ranging from about 0.5 to 15% by weight. In a preferred embodiment, when the surface coating composition is formulated for use as a sealant composition for automobile surfaces, the abrasive material is included in an amount of from about 5 to 15% by weight since the modern acrylic automobile paints, in contrast to the older alkyd or nitrocellulose type paints previously used, do not oxidize as rapidly and therefore have a reduced need for highly abrasive coating compositions.

A preferred abrasive material comprises anhydrous aluminum silicate which is commercially available, for example, as Kaopolite SF, Kaopolite 1168 and Koraid, supplied by Kaopolite Corporation, Union, N.J., and Microfine DT, supplied by Dura Commodities Corporation, Harrison, N.Y.

Film forming waxes may also be included in the surface coating compositions of the present invention. The film forming waxes include soft waxes, hard waxes and blends thereof such as parafin wax, microcrystalline petroleum waxes, carnuba wax, candelilla vegetable waxes, montan waxes derived from coal and synthetic polymer waxes such as oxidized polyethylene. The waxes may be included in the composition of the invention in amounts of up to about 15% by weight.

Additional additives such as surfactants, thickeners and stabilizers may also be included in the surface coating composition of the invention. The surfactant may be any surfactant well known in the art, for example anionic, cationic, non-ionic, amphoteric or the like, and is preferably included in amounts of up to 10% by weight. Similarly, suitable thickeners and stabilizers include those well known in the art.

In a preferred embodiment, the surface coating composition of the present invention includes from about 0.5 to about 15% by weight the amino-functional silicone polymer, from about 0.001 to about 1.0% by weight the metal-chelated acrylic polymer, from about 5 to about 90% by weight hydrocarbon solvent and from about 5 to about 90% by weight water. When the surface coating composition is used as a sealant for providing a glossy and durable surface finish for example on automotive surfaces, the composition includes from about 1 to about 10% by weight the amino-functional silicone polymer, from about 0.001 to about 0.05% by weight the metal-chelated acrylic polymer, from about 15 to about 30% by weight of the hydrocarbon solvent and from about 45 to 75% by weight water. This preferred composition may also include from about 0.5 to about 25% by weight, and most preferably from about 5 to about 15% by weight, of an abrasive material.

The following example demonstrates a preferred surface coating composition in accordance with the present invention.

EXAMPLE 1

A surface coating composition was prepared including the following components:

|  | Wt % |
| --- | --- |
| Dow Corning 536 Fluid | 0.99 |
| (amino-functional silicone polymer) | |
| Dow Corning 531 Fluid | 5.94 |
| (amino-functional silicone polymer) | |
| Monamid 150 ADY* | 0.99 |
| (linoleamide DEA, fatty acid amide surfactant) | |
| Penreco 2158** | 11.88 |
| (Stoddard solvent) | |
| Penreco 2263** | 9.90 |
| (Deodorized Kerosene) | |
| Neocryl SR-276 | 0.99 |
| (zinc-chelated acrylic polymer emulsion - contains 40.% polymer) | |
| Water | 58.66 |
| Kaopolite SF | 0.50 |
| (anhydrous aluminum silicate) | |
| Bentone 38*** | 9.90 |
| (gelling/thickening agent) | |
| Isopropanol | 0.25 |
| | 100.00 |

*Supplied by Mona Industries, Inc., Patterson, New Jersey
**Supplied by Pennzoil Products Company, The Woodlands, Texas
***Supplied by NL Industries, Hightstown, New Jersey The composition was prepared by blending the amino-functional silicone polymers, the fatty acid amide surfactant, the hydrocarbon solvents and the zinc-chelated acrylic polymer thoroughly. Water was then added to the mixture to form an emulsion. The anhydrous aluminum silicate was then added to the emulsion by sifting slowly under high shear mixing. This was followed by the addition of the gelling/thickening agent by sifting slowly under high shear mixing. Finally, the isopropanol was added to the composition which was mixed thoroughly to form a homogenized product. This surface coating composition is particularly suitable for use as a sealant for providing a glossy, durable and protective surface finish on automotive surfaces. The properties of this composition were determined to be as follows:

| | |
|---|---|
| Specific gravity at 25° C. | .95 |
| Volatiles, Wt %, 2 hrs at 105° C. | 86.9 |
| Evaporation rate (ethyl ether = 1) | >1.0 |
| Boiling point, initial, °F. | 200 |
| Boiling point, final, °F. | 420 |
| Emulsion freeze thaw stability, cycles, ASTM D 3209 | 3 (Minimum) |
| Emulsion heat stability at 52° C., days | 30 (Minimum) |
| Viscosity (Brookfield at 30 rpm), cps | 3460 |
| Appearance, visual | Milky white emulsion |

The freeze-thaw stability of the emulsion product passed ASTM D 3209 and the product was determined to be heat stable when exposed to temperatures up to 52° C. in an oven for more than 30 days. The viscosity of the surface coating composition was determined to be 3460 cps using a Brookfield viscometer, spindle 3 at 30 rpm.

EXAMPLE 2

The use of the above composition as a surface sealant for automobile surfaces was evaluated according to ASTM D 3836-79, Standard Practice for Evaluation of Automotive Polish. The surface coating composition of the invention was compared with similar formulations containing only the amino-functional silicone polymers and not including the zinc-chelated acrylic polymer. Each composition was applied on ASTM automotive finish panels of 200 square inches area. The properties evaluated included both application and final performance. The application properties include ease of application, cleaning, drying rate, ease of wipe off, powdering and hardness (ease) of rubbing to maximum gloss. The final properties included gloss, uniformity, distinctness of image, smear and mar resistance, film healing, rebuffability, cleaning, water spotting, gloss retention and dust attraction. According to ASTM D 3836-79, the formulations are rated on a scale of from 0 to 5, zero indicating complete failure and 5 indicating an excellent performance. Four independent evaluations of the performance of the coating composition according to the present invention and the control composition gave the composition according to the present invention an average rating of 4.8 out of a possible 5.0, thus indicating an excellent performance, while the control formulations were given an average rating of 3.5 out of a possible 5.0, thus indicating an inferior overall performance.

One of the most important factors in the surface coating compositions used as a sealant for automobile surfaces is the durability and detergent resistance of the applied composition. Various methods are used in the industry to determine and evaluate these properties.

EXAMPLE 3

A first method of evaluating the detergent resistance of the composition according to the present invention was used wherein the four panels coated with the composition from Example 2 were rubbed with a detergent-containing solution in 15 second intervals of time. Each 15 second interval is equivalent to one commercial car wash. After 120 intervals of 15 seconds each, i.e., 120 equivalent car washes, the four panels having the composition of Example 1 applied thereto were still detergent resistant and the decrease in gloss was less than 10%.

EXAMPLE 4

An automobile was used in this example to evaluate the detergent resistance of the applied coating composition according to the present invention. The car had an initial average gloss measurement of 50–60 using a 20° probe according to ASTM D 1455. After application of the sealant surface coating composition of the present invention, the average gloss measurement of the automobile surface was 89–95. The car was then run through 80 cycles of a commercial, automatic, nonrecycling car washing apparatus. After 80 commercial car washings, the sealant was still detergent resistant and the decrease in gloss was less than 10% from the initial value of 89–95. It is noted that a comparable formulation containing amino-functional silicone polymers but not including the zinc-chelated acrylic polymer failed to provide the necessary detergent resistance and gloss after 25 commercial car washes. Thus, the sealant surface coating composition according to the present invention including a combination of amino-functional silicone polymer and metal-chelated acrylic polymer provides a significant improvement over existing technology.

The present invention has been described herein and illustrated with reference to certain preferred embodiments. As obvious variations may be apparent to those skilled in the art, the invention is not to be limited by the examples and preferred embodiments set forth herein.

What is claimed is:

1. A surface coating composition, comprising from about 0.5 to about 15% by weight of an amino-functional silicone polymer, from about 0.001 to about 1.0% by weight of a metal-chelated acrylic polymer including a metal selected from the group consisting of zinc, nickel, zirconium, cobalt and copper, from about 5 to about 90% by weight of a hydrocarbon solvent and from about 5 to about 90% by weight water.

2. A surface coating composition as defined by claim 1, further including from about 0.5 to about 25% by weight of an abrasive material.

3. A surface coating composition as defined by claim 1, wherein said metal-chelated acrylic polymer comprises a zinc-chelated acrylic polymer.

4. A surface coating composition as defined by claim 1, wherein said hydrocarbon solvent is selected from the group consisting of straight and branched chain aliphatic hydrocarbons, naptha, kerosene, Stoddard solvent, and mixtures thereof.

5. A surface coating composition as defined by claim 2, wherein said abrasive material is selected from the group consisting of aluminum silicate, diatomaceous earth, silica and mixtures thereof.

6. A surface coating composition as defined by claim 1, further comprising one or more additives selected from the group consisting of surfactants, thickeners and stabilizers.

7. A surface sealant composition for providing a glossy and durable surface finish, comprising from about 0.5 to about 15% by weight an amino-functional silicone polymer, from about 0.001 to about 1.0% by weight a metal-chelated acrylic polymer including a metal selected from the group consisting of zinc, nickel, zirconium, cobalt and copper, from about 0.5 to about 25% by weight an abrasive material, from about 5 to about 90% by weight a hydrocarbon solvent, and from about 5 to 90% by weight water.

8. A surface sealant composition as defined by claim 7, wherein said composition comprises from about 1 to about 10% by weight said amino-functional silicone polymer, from about 0.001 to about 0.5% by weight said metal-chelated acrylic polymer, from about 5 to about 15% by weight said abrasive material, from about 15 to about 30% by weight said hydrocarbon solvent, and from about 45 to 75% by weight water.

9. A surface sealant composition as defined by claim 8, further comprising one or more additives selected from the group consisting of surfactants, thickeners, and stabilizers.

10. A surface sealing composition as defined by claim 8, wherein said metal-chelated acrylic polymer comprises a zinc-chelated acrylic polymer.

* * * * *